United States Patent [19]

Spoors et al.

[11] Patent Number: 4,497,781
[45] Date of Patent: Feb. 5, 1985

[54] MANUFACTURE OF MAGNESIUM HYDROXIDE

[75] Inventors: Gerald Spoors, Peterlee; Kenneth W. Pearce, Hartlepool, both of England

[73] Assignee: Steetley Refractories Limited, England

[21] Appl. No.: 442,114

[22] Filed: Nov. 16, 1982

[30] Foreign Application Priority Data

Nov. 17, 1981 [GB] United Kingdom ................ 8134642

[51] Int. Cl.³ .............................................. C01F 5/22
[52] U.S. Cl. ................................... 423/164; 210/665; 210/667; 210/681; 423/155
[58] Field of Search ............... 423/164, 497, 636, 155; 210/665, 667, 681

[56] References Cited

U.S. PATENT DOCUMENTS

| | | | |
|---|---|---|---|
| 2,692,816 | 10/1954 | Vettel et al. | 423/164 |
| 2,703,748 | 3/1955 | Clarke et al. | 423/164 |
| 2,893,840 | 7/1959 | Vettel et al. | 423/164 |
| 3,425,804 | 2/1969 | Rastrelli | 23/201 |
| 3,787,558 | 1/1974 | Briggs et al. | 423/164 |
| 4,035,469 | 7/1977 | Richmond et al. | 423/164 |
| 4,229,423 | 10/1980 | Housh et al. | 423/639 |

Primary Examiner—John Doll
Assistant Examiner—Wayne A. Langel
Attorney, Agent, or Firm—Bacon & Thomas

[57] ABSTRACT

A process for making magnesium hydroxide which comprises treating brine with an adsorptive magnesium hydroxide whereby at least part of the boron ions contained in the brine are adsorbed on to the adsorptive magnesium hydroxide, the brine being mixed countercurrently with the adsorptive magnesium hydroxide in a series of stages such that at each stage the brine is successively contacted with adsorptive magnesium hydroxide from a succeeding stage and there is recovered from the final stage a brine of reduced boron ion content, reacting the brine of reduced boron ion content with alkali to precipitate a low boron magnesium hydroxide and recovering the low boron magnesium hydroxide.

8 Claims, 2 Drawing Figures

MANUFACTURE OF MAGNESIUM HYDROXIDE

FIELD OF THE INVENTION

The present invention relates to the production of magnesium hydroxide.

BACKGROUND OF THE INVENTION

In making magnesium hydroxide from sea water or brines or other aqueous solutions containing magnesium ions, the magnesium ions are precipitated as magnesium hydroxide by treatment with alkali. Unfortunately certain impurities are also precipitated along with the magnesium hydroxide, a particularly undesirable species in certain circumstances being compounds of boron. In this connection, magnesium hydroxide used in the production of high purity refractory magnesium oxide is required to contain less than 0.10% $B_2O_3$/100 MgO and preferably less than 0.075% $B_2O_3$/100 MgO prior to the calcination stage, and is referred to as low boron magnesium hydroxide.

It is known that magnesium hydroxide containing less than 0.10% $B_2O_3$/100 MgO and preferably less than 0.075% $B_2O_3$/100 MgO can be precipitated from seawater by addition of alkali in excess of the stoichiometric requirement for precipitating 100% of the magnesium ions contained therein. Commonly an addition of alkali equivalent to 105–107% of the seawater magnesium ion content is made for this purpose. Unfortunately where the alkali employed is calcium based (as with lime or dolomitic lime), the high pH created by the excess hydroxyl ions present in solution due to the excess lime causes an increase in the amount of calcium ions adsorbed by the magnesium hydroxide, a large proportion of which cannot be removed by washing, and remains as an impurity when the magnesium hydroxide is calcined or deadburnt. The present invention provides a process for making low boron magnesium hydroxide without causing such excessive increase in the amount of calcium ions adsorbed.

BRIEF DESCRIPTION OF THE INVENTION

In essence the present invention makes use of the fact that magnesium hydroxide has an affinity for boron ions and will adsorb them from brine, e.g. seawater, and this fact has been used in a way in which a favourable economic balance between the amount of adsorbing magnesium hydroxide and the amount of magnesium containing solution treated, is achieved.

Accordingly the present invention provides a process for making magnesium hydroxide which comprises treating brine with an adsorptive magnesium hydroxide whereby at least part of the boron ions contained in the brine are adsorbed on to the adsorptive magnesium hydroxide, the brine being mixed countercurrently with the adsorptive magnesium hydroxide in a series of stages such that at each stage the brine is successively contacted with adsorptive magnesium hydroxide from a succeeding stage and there is recovered from the final stage a brine of reduced boron ion content, reacting the brine of reduced boron ion content with alkali to precipitate a low boron magnesium hydroxide and recovering the low boron magnesium hydroxide.

The invention includes a process for removing boron ions from brine comprising treating brine with adsorptive magnesium hydroxide which adsorbs boron ions from the brine wherein the magnesium hydroxide and brine are contacted countercurrently so that brine is progressively contacted with magnesium hydroxide of decreasing boron content and magnesium hydroxide is progressively contacted with brine of increasing boron content.

The invention also includes a process for making magnesium hydroxide which process comprises taking brine from which boron has been removed by the process just described then reacting the brine of reduced boron ion content with alkali to precipitate a low boron magnesium hydroxide and recovering the low boron magnesium hydroxide.

DETAILED DESCRIPTION OF THE INVENTION

With a single stage contact of $Mg(OH)_2$ and seawater, a ratio of the amount of adsorbing $Mg(OH)_2$ to the concentration of $Mg^{++}$ in the seawater being treated of 5:1 or more (both being expressed as gMgO/l) has been required to produce seawater of suitable boron content for low boron magnesium hydroxide production. According to the process of the invention it has been found possible to reduce the ratio of adsorbing $Mg(OH)_2$ to that contained in seawater as $Mg^{++}$ ions to 1.5:1 to 2.0:1, for example 1.67:1 or less, and still obtain seawater suitably low in boron for low boron magnesium hydroxide production. Suitable brine boron concentrations are less than 6 ppm $B_2O_3$ and preferably less than 5 ppm $B_2O_3$.

The adsorptive magnesium hydroxide may be obtained by a number of methods.

First the adsorptive magnesium hydroxide may be obtained by reacting sea water or other brine with alkali by any of the methods well described in the literature.

Secondly, all or a proportion of the adsorptive magnesium hydroxide may comprise part of the low boron magnesium hydroxide obtained as a result of the process of the present invention.

In a further method, after obtaining an initial amount of adsorptive magnesium hydroxide by one of the preceding methods, the spent adsorptive magnesium hydroxide containing adsorbed boron species may be processed to remove boron e.g. by using a process which comprises contacting the spent adsorptive magnesium hydroxide with alkali such as a solution containing sodium hydroxide or calcium hydroxide.

Preferably the adsorptive magnesium hydroxide has a low initial boron content, preferably below 0.5% $B_2O_3$/100 MgO. More preferably, the initial boron content will be less than 0.10% $B_2O_3$/100 MgO, e.g. less than 0.075% $B_2O_3$/100 MgO. When the initial boron content is higher than 0.5% $B_2O_3$/100 MgO, the magnesium hydroxide does not adsorb boron ions with such efficiency.

In order to minimise the production of excessive quantities of magnesium hydroxide containing adsorbed boron compounds in those instances where the absorptive magnesium hydroxide is not regenerated, or in order to reduce further the quantity of boron ion in the seawater or other brine, the brine of reduced boron ion content obtained by the process of the present invention removing boron from brine may, in a modification of that process, be treated or contacted with a boron ion selective ion-exchange resin whereby boron ion is adsorbed from the brine onto the resin.

One particular resin suitable for this purpose is Amberlite IRA 743 (Rohm & Haas Co.), which is easily regenerated by sulphuric acid elution of the borate followed by alkaline treatment to remove the sulphate, a proportion of the alkali being readily available on a seawater magnesia plant. Other resins are the products obtained by reacting polyhydroxylalkyl amines with a haloalkylated, crosslinked, insoluble copolymer of a monovinyl aromatic hydrocarbon and a compound which is copolymerizable with said monovinyl hydrocarbon and which contains at least two non-conjugated groups of the structure $CH_2=C=$; (as described in U.S. patent specification No. 3,567,369). Another possible resin is obtained by crosslinking of a natural plant hydrocolloid (the poly-saccharide guaran from guar seeds).

If it is not regenerated, the adsorptive magnesium hydroxide containing adsorbed boron compounds may be recovered, as by filtration, and converted to refractory magnesia by dead burning. The magnesium hydroxide of reduced boron content may be calcined to form for example pharmaceutical magnesia or dead burned to form a superior grade of refractory magnesia. The present invention includes magnesium hydroxide of low boron content produced by the process of the invention and also magnesium oxides and other products obtained therefrom.

The stagewise contact of a seawater or other brine with adsorptive magnesium hydroxide may for example be achieved by continuous countercurrent decantation in a series of mixer reaction vessels wherein brine progresses along the series of vessels from the top of one vessel to the top of the next and wherein adsorptive magnesium hydroxide, in countercurrent flow to the brine, progresses from the base of one vessel to the top of the next vessel, mixing of the adsorptive magnesium hydroxide and brine and settling of adsorptive magnesium hydroxide occurring within each vessel. Alternatively stagewise contact may be obtained by continuous countercurrent decantation in a series of zones arranged in a column in which adsorptive magnesium hydroxide travels down the column countercurrent to the brine, mixing and sedimentation occurring between the two in each of the zones.

Preferably the number of stages involved in continuous countercurrent contact is 2 to 5. In the case of a column the stages may not be recognisable as definite physical barriers but nevertheless the column can be designed to give a theoretical equivalent number of stages.

In the process of the present invention for making magnesium hydroxide the boron depleted magnesium bearing solution, obtained from seawater or other brine, is treated with an alkali, generally a caustic alkali and most commonly either lime or slaked lime, dolomitic lime or slaked dolomitic lime or caustic soda. The best actual pH to employ for the precipitation will depend on the amount of boron ions remaining in the brine and on the calcium impurity that can be tolerated for the particular grade of magnesium hydroxide being produced. For instance if complete depletion of the boron ions from the seawater or other brine has occurred, addition of alkali equivalent to or less than the stoichiometric requirement may be made, corresponding to a pH of 10.8 or less, in which case a boron free product with 1% CaO/100 MgO or less can be produced. However if seawater or other brine of boron residue 4–6 ppm (as $B_2O_3$) is produced by the process of the present invention, an alkali addition equivalent to 101.5–102.5% of the seawater or other brine magnesium ion content and corresponding to a pH of the order of 11.2 to 11.4 will be required to produce a low boron product. Under these circumstances the calcium impurity is of the order of 1.5% CaO/100 MgO or less. This compares with current procedure in which seawater of normal boron content (approximately 15 ppm $B_2O_3$) is reacted with alkali at a pH of 11.7/11.8 to produce a product containing in excess of 1.8% CaO/100 MgO. All calcium values are as obtained on the washed magnesium hydroxide.

The precipitation may be achieved by adding a suspension or solution of the appropriate alkali to the magnesium bearing solution which, if necessary, has been treated with sulphuric acid to remove carbonate ions. The magnesium hydroxide thereby precipitated may then be separated by a process of sedimentation or settling whereby the settled sludge or cream of magnesium hydroxide can be separated and recovered and the used or spent brine or seawater rejected. This sedimentation is usually carried out in large tanks known as thickeners which are constructed and operated so that they can receive a continuous flow or suspension to be settled and can discharge separately the sludge of magnesium hydroxide to be further processed and recovered and the spent brine or seawater to waste.

The solids content of the magnesium hydroxide sludge recovered from the thickeners generally runs at a concentration of from 150 to 400 grammes magnesium hydroxide per litre according to the conditions under which the magnesium hydroxide has been precipitated and the efficiency and mode of operation of the thickener.

The thickened sludge is then generally further dewatered by filtration. Commonly, in producing magnesia on a large scale as generally required for refractory purposes, continuous vacuum filters of the drum, panel or disc type are used. From this de-watering a cake is obtained which has the consistency of a stiff paste and generally contains from 40% to 60% solids.

In further processing the sludge of magnesium hydroxide either to caustic calcined magnesia or to deadburnt magnesia, it is fed into appropriate furnaces or kilns, e.g. multiple hearth furnaces or rotary kilns and subjected to appropriate heat treatment. For caustic calcining an appropriate heat treatment would employ a maximum temperature of up to about 1200° C. but more usually up to about 1000° C. For dead-burning the heat treatment would be above about 1600° C., or higher even up to 2000° C.

When pastes of the usual concentration, i.e. those containing from 40% to 60% solids are subjected to such heat treatments then the resulting magnesia product is in the form of a mixture of fine granules to powder and very few of the granules would have a greater mean diameter than 6.35 mms size.

The problem of how to make dead-burnt magnesia of large grain size and high density from high purity magnesium hydroxide has been solved in one way by the so called "pelletising process". In this process the magnesium hydroxide is first caustic calcined to a chemically reactive oxide generally in a multiple hearth furnace, the oxide is then briquetted in high pressure briquette tools and the briquettes are then dead-burnt, generally in rotary kilns or special gas fired shaft kilns.

BRIEF DESCRIPTION OF THE DRAWINGS

The accompanying figures are provided to illustrate certain embodiments and features of the present invention.

DESCRIPTION OF THE DRAWINGS

Figure 1:
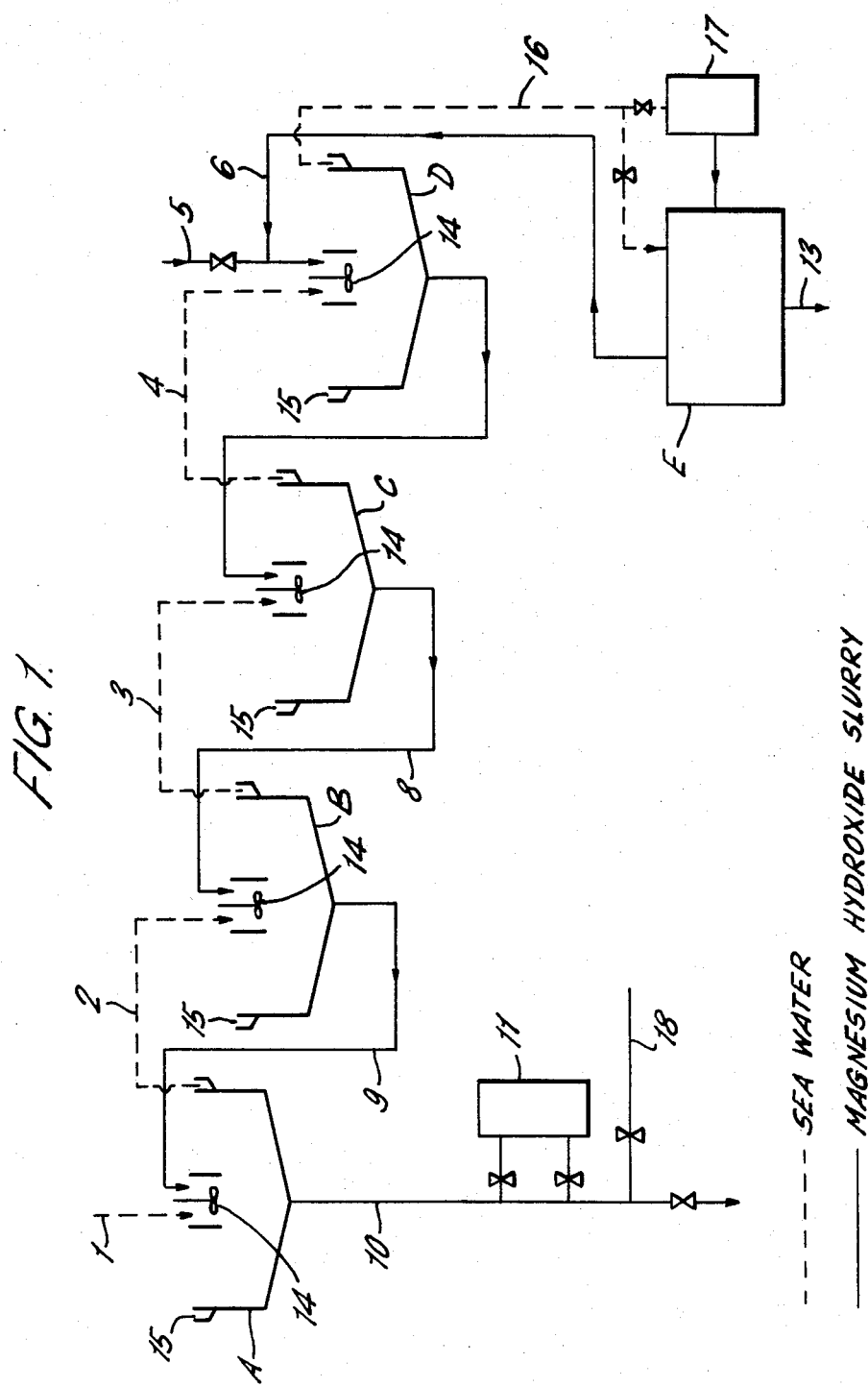
FIG. 1 is a flow diagram of a method of carrying out the present invention.

Referring to FIG. 1 there is illustrated a series of mixer settlers A, B, C and D each provided with a stirrer 14 and an overflow gutter 15. Lines 2, 3 and 4 take material from the overflow gutter of one mixer, settler into the neighbouring mixer, settler. Similarly lines 7, 8 and 9 take settled material from the base of one mixer, settler and feed it into the mixing zone of the next settler. The direction of flow in lines 7, 8 and 9 is opposite to that in lines 2, 3 and 4.

Fresh seawater is fed into mixer, settler A via line 1 and boron reduced seawater is removed from vessel D via line 16 either to be fed direct into reaction vessel E or to be fed via ion exchange plant 17 into reaction vessel E there to be reacted with alkali.

Low boron magnesium hydroxide is removed via line 13.

Part of the magnesium hydroxide precipitated in vessel E may be fed to mixer settler D via line 6 either as the sole feed of adsorptive magnesium hydroxide or as a supplementary feed to a feed from a separate source via line 5.

Magnesium hydroxide containing adsorbed boron species is removed from vessel A via line 10. If desired all or part of this magnesium hydroxide may be passed through a reactor 11 where the adsorbed boron can be removed by reaction with alkali and the magnesium hydroxide thereby obtained can be returned via line 18 to line 5 and mixer, settler D.

Figure 2:
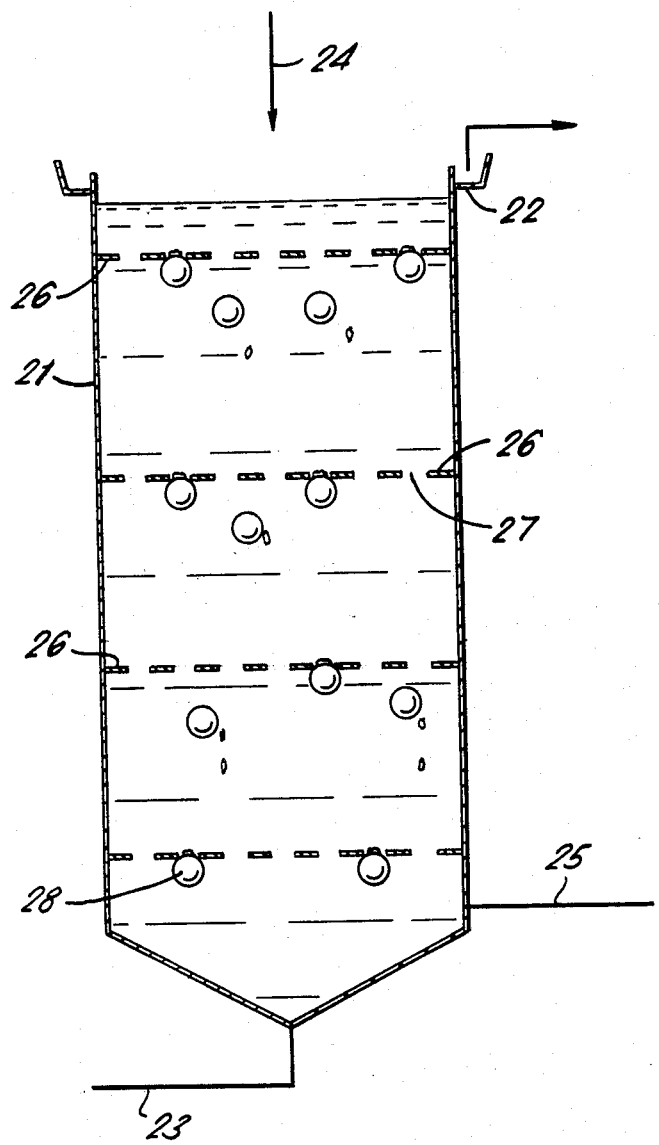
FIG. 2 illustrates a continuous decantation column.

Referring to FIG. 2 there is illustrated a particularly effective device for obtaining continuous countercurrent decantation between a vessel 21 having an overflow gutter 22 and an underflow line 23. Raw materials are fed in through lines 24 and 25. The vessel is divided into a number of zones in which mixing and settling is achieved. The precise way in which mixing and settling happens varies but in one method, as described in B. Pat. No. 1579885, the vessel is devided into a number of plates 26 having apertures 27 these apertures being normally blocked by balls 28 located on the underside of the plates and having a density lower than the liquid in the vessel. Solid material e.g. magnesium hydroxide, collecting on the upper surface of the balls causes them to sink away from the apertures and rotate to spill off the solid whereupon the balls again rise to close the apertures. In this way solid progresses in stages down the vessel countercurrent to liquid such as seawater which is forced up the vessel.

The specification of British Pat. No. 1579885 describes alternative device for obtaining continuous countercurrent decantation between adsorptive magnesium hydroxide and seawater.

EXAMPLES

The following examples are given to illustrate the present invention.

EXAMPLE 1

To simulate the large scale mixer/settlers shown in FIG. 1, laboratory studies were carried out in a series of separated agitated reactors and settlers. The reactor vessels were each of 5 liters capacity with a facility for gravity overflow to the appropriate settler which had facilities for pumping out of settled sludge and for gravity overflow of clarified seawater.

Seawater (I) from the North Sea in the vicinity of Hartlepool, Cleveland containing 15.4 ppm $B_2O_3$ and 2.15 gMgO/l. in the form of $Mg^{++}$ ions was treated with sulphuric acid to reduce the $CO_2$ content to about 10 ppm, and pumped into the first of the deboronation stages (A) as indicated in FIG. 1 at a rate of 4 liters/minute. Simultaneously magnesium hydroxide slurry already prepared by precipitation from seawater was pumped via line 5 into the final stage (D). Prior to commencing this continuous process, each of the stages had been charged with the same seawater and adsorbing magnesium hydroxide to give a magnesium hydroxide concentration in each stage of 5 gMgO/l. With the advent of the continuous process the seawater progressed at a rate of 4 liters/minute through the deboronation stages (A) - (B) - (C) - (D), whilst the adsorbing magnesium hydroxide progressed in a manner countercurrent to the seawater from stage (D) - (C) - (B) - (A). The rate of addition of adsorbing $Mg(OH)_2$ slurry to stage D and the rate of transfer of adsorbing $Mg(OH)_2$ slurry from (D) - (C), (C) - (B), (B) - (A), and finally the rate at which the $Mg(OH)_2$ was pumped out of the process was such that the overall ratio of adsorbing $Mg(OH)_2$ being added to (D), to the $Mg^{++}$ ions present in the seawater was 1.67:1 when both are expressed as MgO.

When equilibrium had been established within the system for some time, samples were taken from each stage for boron analysis to assess the efficiency of each stage for deboronation. Table I shows the results of analysis.

TABLE 1

| Boron analysis at each stage Seawater boron analysis (ppm $B_2O_3$) | | | | |
|---|---|---|---|---|
| | Stage A | Stage B | Stage C | Stage D |
| Seawater Feed | (overflow) | (overflow) | (overflow) | (overflow) |
| 15.4 | 13.5 | 12.3 | 9.8 | 5.6 |

| Adsorbing $Mg(OH)_2$ boron analysis (% $B_2O_3$/100 MgO) | | | | |
|---|---|---|---|---|
| Stage A | Stage B | Stage 3 | Stage D | $Mg(OH)_2$ Feed |
| 0.347 | 0.295 | 0.262 | 0.233 | 0.077 |

The partially deboronated seawater containing 5.6 ppm $B_2O_3$ was pumped via line 16 to an agitated reaction vessel and reacted with calcium hydroxide slurry at a pH of 11.3 in the presence of preformed $Mg(OH)_2$ seed. The $Mg(OH)_2$ produced was found to have good settling properties, and after fresh water washing at 10,000 gallons/tonne MgO was found to have the following typical analysis:

| CaO | $SiO_2$ | $Fe_2O_3$ | $Al_2O_3$ | $B_2O_3$ | (per 100 MgO) |
|---|---|---|---|---|---|
| 1.48 | 0.30 | 0.06 | 0.08 | 0.070 | |

The level of $SiO_2$, $Fe_2O_3$ and $Al_2O_3$ impurities will of course vary with the quality of lime used, and can further be altered by suitable additions prior to heat treatment.

EXAMPLE 2

The partially deboronated seawater produced under conditions similar to those given in Example 1, was diverted to an ion exchange column 17 containing the B specific resin Amberlite IRA 743. The water leaving the ion exchange plant was found to contain undetectably low amounts of boron and was directed to a low boron reactor for reaction with lime slurry in the presence of $Mg(OH)_2$ seed, under stoichiometric conditions.

Once equilibrium had been established a sample of settled slurry was freshwater washed and analysed, revealing the following impurity levels:

| CaO | $SiO_2$ | $Fe_2O_3$ | $Al_2O_3$ | $B_2O_3$ | (per 100 MgO) |
|------|---------|-----------|-----------|----------|---------------|
| 1.2  | 0.30    | 0.06      | 0.08      | 0.025    |               |

This indicated that the actual boron content of the deboronated seawater was of the order of 0.5 ppm or less, there being only trace quantities of that element in the lime used.

EXAMPLE 3

Referring to FIG. 1, a sample of the high boron magnesium hydroxide slurry leaving deboronation stage A via line 10 was taken and washed with lime slurry in reactor 11 at a rate of 10 $gCa(OH)_2$/100 $gMg/(OH)_2$. This was followed by freshwater washing at 15,000 gallons/tonne MgO and filtration. Analysis of the slurry before and after this alkaline regeneration was as follows:

|                    | Analysis (% loss free) ||||| 
|                    | CaO  | $SiO_2$ | $Fe_2O_3$ | $Al_2O_3$ | $B_2O_3$ |
|--------------------|------|---------|-----------|-----------|----------|
| Before regeneration| 1.84 | 0.40    | 0.16      | 0.15      | 0.371    |
| After regeneration | 1.86 | 0.41    | 0.16      | 0.16      | 0.072    |

This regenerated slurry was suitable for recirculation to deboronation stage D, or alternatively could be directed to filtration and heat treatment.

COMPARATIVE EXAMPLE

The reaction of Example 1 was again carried out but this time without the prior removal of boron species from the seawater. Hence seawater and lime slurry were reacted in the presence of preformed $Mg(OH)_2$ slurry as seed, at a pH of 11.3. Once equilibrium was established a sample of the settled slurry was taken and freshwater washed at 10,000 gallons/tonne and filtered and was shown to have the following impurity levels:

| CaO  | $SiO_2$ | $Fe_2O_3$ | $Al_2O_3$ | $B_2O_3$ | (per 100 MgO) |
|------|---------|-----------|-----------|----------|---------------|
| 1.50 | 0.31    | 0.07      | 0.07      | 0.16     |               |

EXAMPLE 4

Referring to FIG. 2, seawater of similar composition to that used in Example 1, was introduced into the base of the column 21 along the line 25 at a rate of 6 l/min. Simultaneously magnesium hydroxide slurry that had already been prepared by precipitation from seawater was introduced through line 24. Once an appreciable quantity of $Mg(OH)_2$ slurry had been introduced into the column, and significant beds of slurry maintained at each stage and in the final settling cone, continuous pumping out of slurry from the final settling cone commenced through line 23. In this way the imput and output of slurry were maintained equal. The ratio of adsorbing $Mg(OH)_2$ being introduced into the column, to the $Mg^{++}$ ion present in the seawater was 1.9 when both are expressed as MgO.

When equilibrium had been established within the system for some time, samples were taken from the system to assess the efficiency of deboronation taking place. It was seen that this seawater boron content (as $B_2O_3$) was reduced from 15.4 ppm to 5.9 ppm by countercurrent contact with $Mg(OH)_2$ slurry in this way.

We claim:

1. A method for making magnesium hydroxide which comprises treating brine with an adsorptive magnesium hydroxide in an amount such that the ratio of $Mg(OH)_2$ to $Mg^{++}$ in the brine, expressed as gMgO/l, is between 1.5:1 to 2:1, whereby at least part of the boron ions contained in the brine are adsorbed on to the adsorptive magnesium hydroxide, the brine being mixed countercurrently with the adsorptive magnesium hydroxide in a series of stages such that at each stage the brine is successively contacted with adsorptive magnesium hydroxide from a succeeding stage and there is recovered from the final stage a brine of reduced boron ion content, reacting the brine of reduced boron ion content with alkali to precipitate a low boron magnesium hydroxide and recovering the low boron magnesium hydroxide.

2. A method as claimed in claim 1 wherein the said initial boron content of the adsorptive magnesium hydroxide is below 0.5% $B_2O_3$/100 MgO.

3. A method as claimed in claim 2 wherein the initial boron content is less than 0.075% $B_2O_3$/100 MgO.

4. A method as claimed in claim 1 wherein the brine is treated with a boron ion selective ion exchange resin to remove boron therefrom in addition to the treatment with adsorptive magnesium hydroxide.

5. A method as claimed in claim 1 wherein the counter-current mixing of the brine and adsorptive magnesium hydroxide is carried out by continuous countercurrent decantation in a series of mixer reaction vessels wherein brine progresses along the series of vessels from the top of one vessel to the top of the next and wherein adsorptive magnesium hydroxide, in countercurrent flow to the brine, progresses from the base of one vessel to the top of the next vessel, mixing of the adsorptive magnesium hydroxide and brine and settling of adsorptive magnesium hydroxide occurring within each vessel.

6. A method as claimed in claim 1 wherein the counter-current mixing of the brine and adsorptive magnesium hydroxide is carried out by continuous countercurrent decantation in a series of zones arranged in a column in which adsorptive magnesium hydroxide travels down the column countercurrent to the brine, mixing and sedimentation occurring between the two in each of the zones.

7. A method as claimed in claim 1 wherein the brine of reduced boron ion content is treated with a base selected from the group consisting of lime, slaked lime, dolometic lime, slaked dolomitic lime and sodium hydroxide to precipitate the low boron magnesium hydroxide.

8. A method as claimed in claim 1 wherein the low boron magnesium hydroxide is precipitated at a pH of 10.8 or less.

* * * * *